United States Patent
Ben Dayan et al.

(10) Patent No.: US 12,259,782 B2
(45) Date of Patent: *Mar. 25, 2025

(54) EFFICIENT NETWORKING FOR A DISTRIBUTED STORAGE SYSTEM

(71) Applicant: Weka.IO Ltd., Tel Aviv (IL)

(72) Inventors: Maor Ben Dayan, Tel Aviv (IL); Omri Palmon, Tel Aviv (IL); Liran Zvibel, Tel Aviv (IL); Tomer Filiba, Tel Aviv (IL)

(73) Assignee: Weka.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,833

(22) Filed: Mar. 25, 2024

(65) Prior Publication Data
US 2024/0232005 A1 Jul. 11, 2024

Related U.S. Application Data

(63) Continuation of application No. 17/958,480, filed on Oct. 3, 2022, now Pat. No. 11,994,944, which is a continuation of application No. 17/154,459, filed on Jan. 21, 2021, now Pat. No. 11,494,257, which is a continuation of application No. 16/121,942, filed on Sep. 5, 2018, now Pat. No. 10,936,405.

(60) Provisional application No. 62/585,047, filed on Nov. 13, 2017.

(51) Int. Cl.
| | |
|---|---|
| G06F 11/00 | (2006.01) |
| G06F 3/06 | (2006.01) |
| G06F 11/10 | (2006.01) |
| H04L 67/1097 | (2022.01) |

(52) U.S. Cl.
CPC ........ *G06F 11/1004* (2013.01); *G06F 3/0619* (2013.01); *G06F 3/064* (2013.01); *G06F 3/067* (2013.01); *H04L 67/1097* (2013.01)

(58) Field of Classification Search
CPC .... G06F 11/1004; G06F 3/0619; G06F 3/064; G06F 3/067
See application file for complete search history.

(56) References Cited

U.S. PATENT DOCUMENTS

| | | | | |
|---|---|---|---|---|
| 5,761,427 A | * | 6/1998 | Shah | G06F 13/128 712/1 |
| 6,345,301 B1 | * | 2/2002 | Burns | H04L 69/12 709/230 |
| 6,487,636 B1 | | 11/2002 | Dolphin et al. | |

(Continued)

OTHER PUBLICATIONS

Int'l Search Report and Written Opinion Appln No. PCT/IB2016/001177 dated Dec. 2, 2016.

(Continued)

*Primary Examiner* — Esaw T Abraham
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. Data communication is made more efficient by removing the need to copy data in the networking stack, using hardware accelerated end-to-end checksum calculation, and supporting transmission formatting of data and header for special cases.

70 Claims, 7 Drawing Sheets

(56) References Cited

U.S. PATENT DOCUMENTS

| | | | |
|---|---|---|---|
| 6,487,689 B1 * | 11/2002 | Chuah | H04L 12/4633 370/466 |
| 7,447,839 B2 | 4/2008 | Uppala | |
| 7,668,162 B1 * | 2/2010 | Albo | H04L 69/04 370/389 |
| 7,681,072 B1 | 3/2010 | Gibson et al. | |
| 7,793,146 B1 | 9/2010 | Gibson et al. | |
| 7,877,511 B1 | 1/2011 | Berger et al. | |
| 7,889,730 B1 * | 2/2011 | Albo | H04L 45/00 370/389 |
| 8,347,010 B1 | 1/2013 | Radovanovic | |
| 8,645,749 B2 | 2/2014 | Reche | |
| 8,918,478 B2 | 12/2014 | Ozzie et al. | |
| 9,087,012 B1 | 7/2015 | Hayes et al. | |
| 9,448,887 B1 | 9/2016 | Ben Dayan et al. | |
| 9,747,162 B2 | 8/2017 | Ben Dayan et al. | |
| 10,936,405 B2 | 3/2021 | Ben Dayan et al. | |
| 2003/0115218 A1 | 6/2003 | Bobbitt et al. | |
| 2004/0098415 A1 | 5/2004 | Bone et al. | |
| 2005/0289152 A1 | 12/2005 | Earl et al. | |
| 2007/0061542 A1 | 3/2007 | Uppala | |
| 2007/0143261 A1 | 6/2007 | Uppala | |
| 2007/0143311 A1 | 6/2007 | Uppala | |
| 2009/0119541 A1 | 5/2009 | Inoue et al. | |
| 2010/0199125 A1 | 8/2010 | Reche | |
| 2011/0213994 A1 | 9/2011 | Thereska et al. | |
| 2012/0210095 A1 | 8/2012 | Nellans et al. | |
| 2014/0244897 A1 | 8/2014 | Goss et al. | |
| 2014/0281280 A1 | 9/2014 | Goss et al. | |
| 2015/0248366 A1 | 9/2015 | Bergsten et al. | |
| 2015/0254088 A1 | 9/2015 | Chou et al. | |
| 2015/0355971 A1 | 12/2015 | Becker-Szendy et al. | |
| 2016/0246677 A1 | 8/2016 | Sangamkar et al. | |

OTHER PUBLICATIONS

Int'l Preliminary Report on Patentability Appln No. PCT/IB2016/001177 dated Mar. 8, 2018.

Int'l Search Report and Written Opinion Appln No. PCT/IB2016/000996 dated Oct. 20, 2016.

Int'l Preliminary Report on Patentability Appln No. PCT/IB2016/000996 dated Jan. 2, 2018.

Extended European Search Report Appln No. 16817312.8-1217 dated Oct. 25, 2018.

* cited by examiner

EFFICIENT NETWORKING FOR A DISTRIBUTED STORAGE SYSTEM

PRIORITY CLAIM

This application is a continuation application of U.S. Ser. No. 17/958,480, filed Oct. 3, 2022 (U.S. Pat. No. 11,994,944), which is a continuation application of U.S. Ser. No. 17/154,459, filed Jan. 21, 2021 (U.S. Pat. No. 11,494,257), which is a continuation application of U.S. Ser. No. 16/121,942, filed Sep. 5, 2018 (U.S. Pat. No. 10,936,405), which claims priority to the following application, which is hereby incorporated herein by reference: United States U.S. provisional patent application 62/585,047, filed on Nov. 13, 2017. Each of the above-referenced applications is hereby incorporated herein by reference in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for efficient networking for a distributed storage system substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system, is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
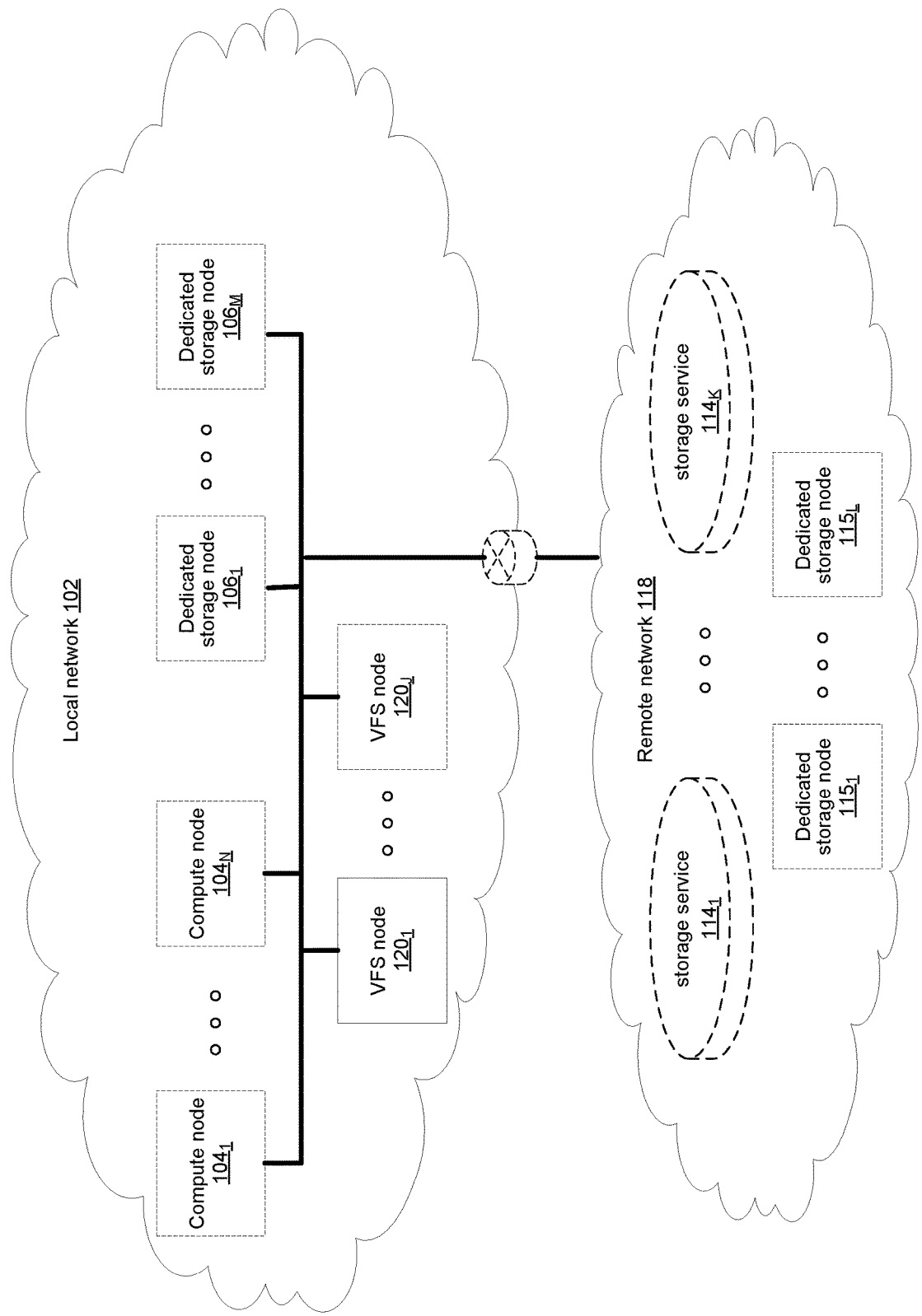
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node 120$_j$ (j an integer, where 1≤j≤J) is a networked computing device (e.g., a server, personal computer, or the like) that comprises circuitry for running VFS processes and, optionally, client processes (either directly on an operating system of the device 104$_n$, and/or in one or more virtual machines running in the device 104$n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
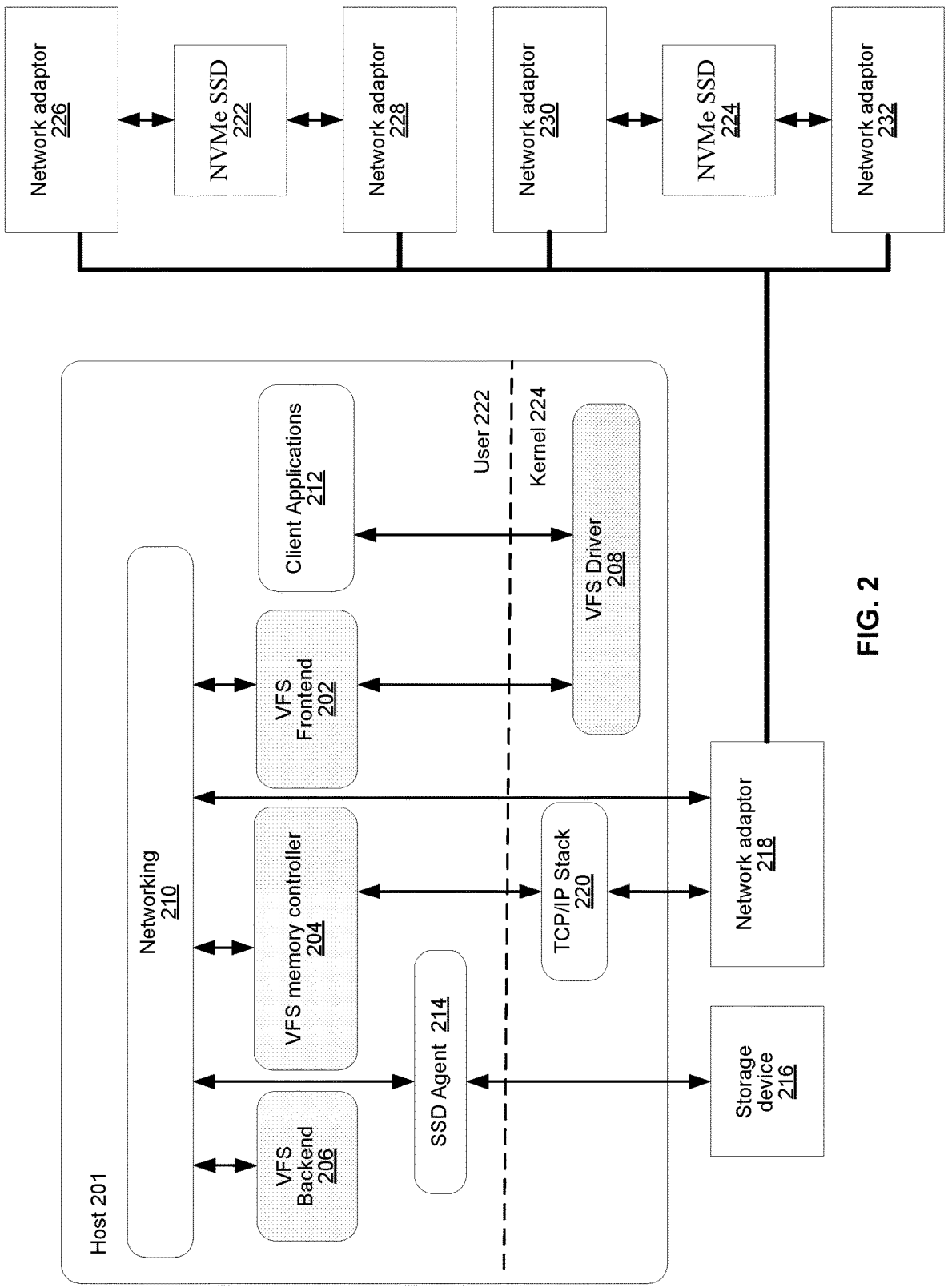
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-OF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-OF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
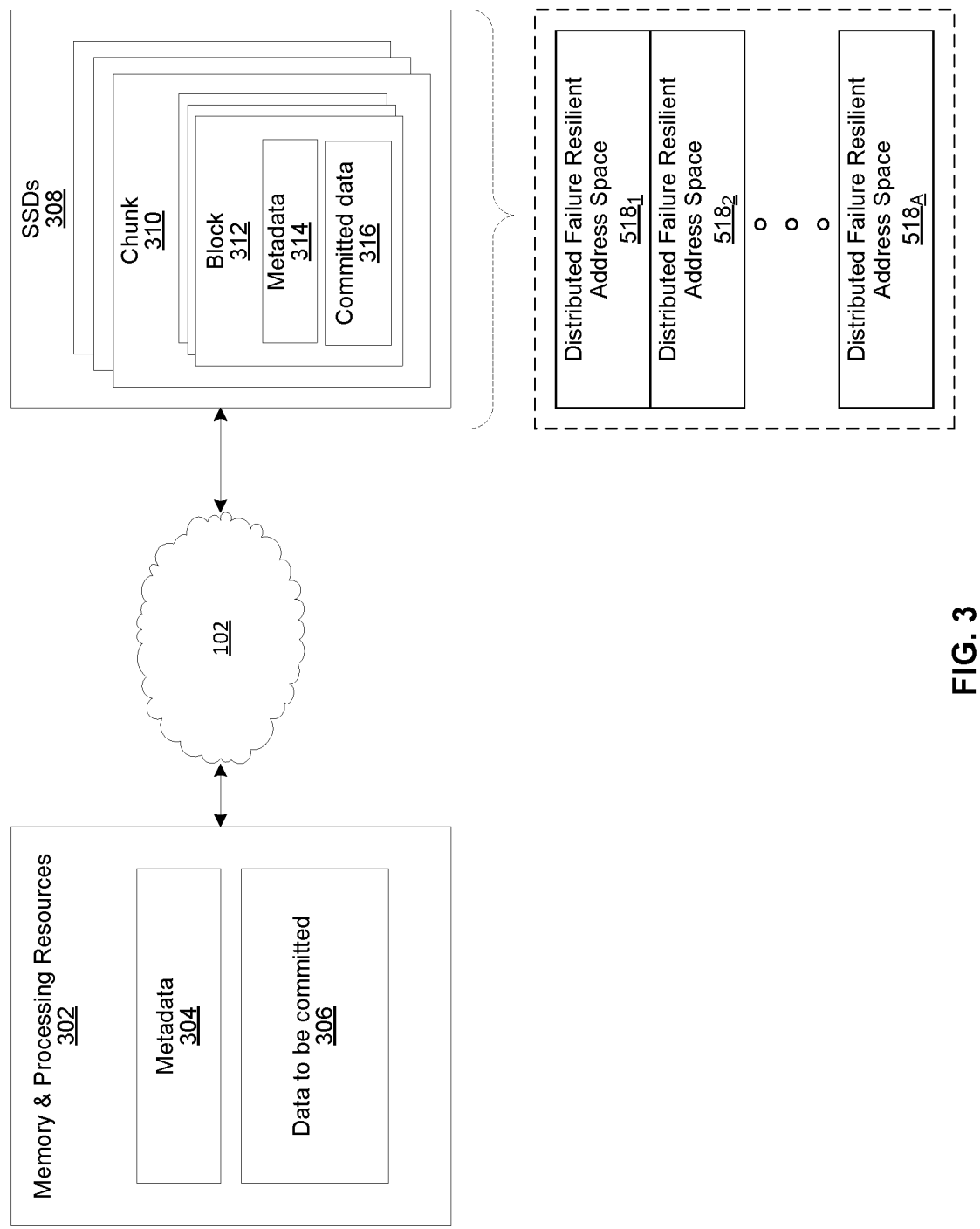
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICS, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather than the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26−5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

As discussed above, various embodiments of the disclosure may provide distributed data storage. Accordingly, data transfer to and from servers may need to be efficient in order to minimize latency for smaller data transfers as well as larger data transfers. There is overhead in using a typical networking stack for sending and receiving data over a network. This overhead can be reduced if some or all of the networking stack can be bypassed. This may be done, for example, by sending and receiving Ethernet frames (or InfiniBand frames if that technology is used) directly from user space to the hardware without having to communicate with the Kernel.

Additionally, when copying data, the time for a processor such as, for example, the element 302, to execute instructions to read and write data adds to the latency. Also, data to be copied presently will most likely not be in cache, which then requires cache flushing and loading the cache with data to be copied. The caches for a processor such as, for example, the element 302 may also get contaminated by user data that is useless for other operations and/or users. The initial flushing and loading the cache also adds to the latency, as well as cache churn that may occur during the copy process.

Additionally, operation can generally be done faster in hardware (HW) than software, and, thus, HW usage can reduce latency.

Figure 4:
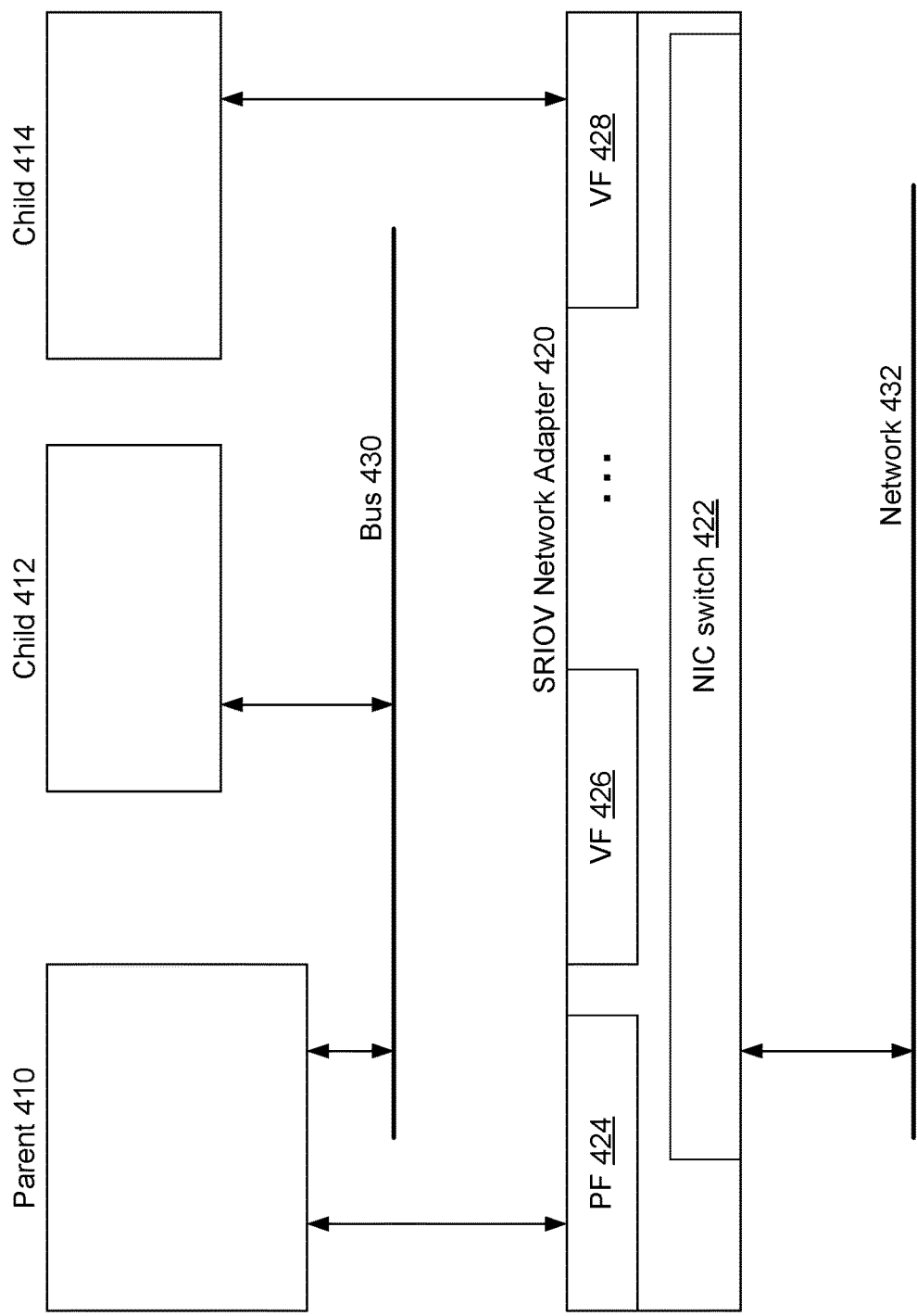
FIG. 4 illustrates an example usage of SR-IOV in accordance with an example implementation of this disclosure.

FIG. 4 illustrates an example usage of SR-IOV in accordance with an example implementation of this disclosure.

Referring to FIG. 4, there are shown a parent partition 410 and child partitions 412 and 414. The child partitions 412 and 414 may be able to communicate with the parent partition 410 via the bus 430. The parent partition 410 may be able to communicate with the network adaptor 420 to transmit data to and receive data from the network 432. The parent partition 410 may also set up the network adaptor 420 to enable the child partitions 412 and 414 to communicate with the network 432 using the more streamlined SR-IOV technology.

SR-IOV may be leveraged by hypervisors (parent partition) to efficiently run several operating systems (child partitions) on the same servers to get direct access into the NIC. When SR-IOV is employed, the NIC acts as a switch for several virtual NICs, and each virtual NIC has its own MAC address. The parent partition 410 has access to the physical function 424 to get access to the network 432. The parent partition 410 may use, for example, PCIe functions to set up the child partitions 412 and 414 to get access to a respective virtual function.

Prior to the child partition 412 being set up to use the SR-IOV technology, data from the network 432 for the child partition 412 may be received by the NIC switch 422 in the network adaptor 420. The NIC switch 422 routes the data to the physical function 424, which then sends the data to the parent partition 410. The parent partition 410 may then send the data to the child partition 412 via the bus 430. The child partition 412 may transmit data using a similar route in reverse.

However, when the parent partition 410 configures the network adaptor 420 so that the child partition 414 is set up to use the SR-IOV technology, data may be received by the NIC switch 422, which then sends the data to the child partition 414 via the virtual function 428. Accordingly, it can be seen that latency is reduced by removing the data path through the parent partition 410.

Figure 5:
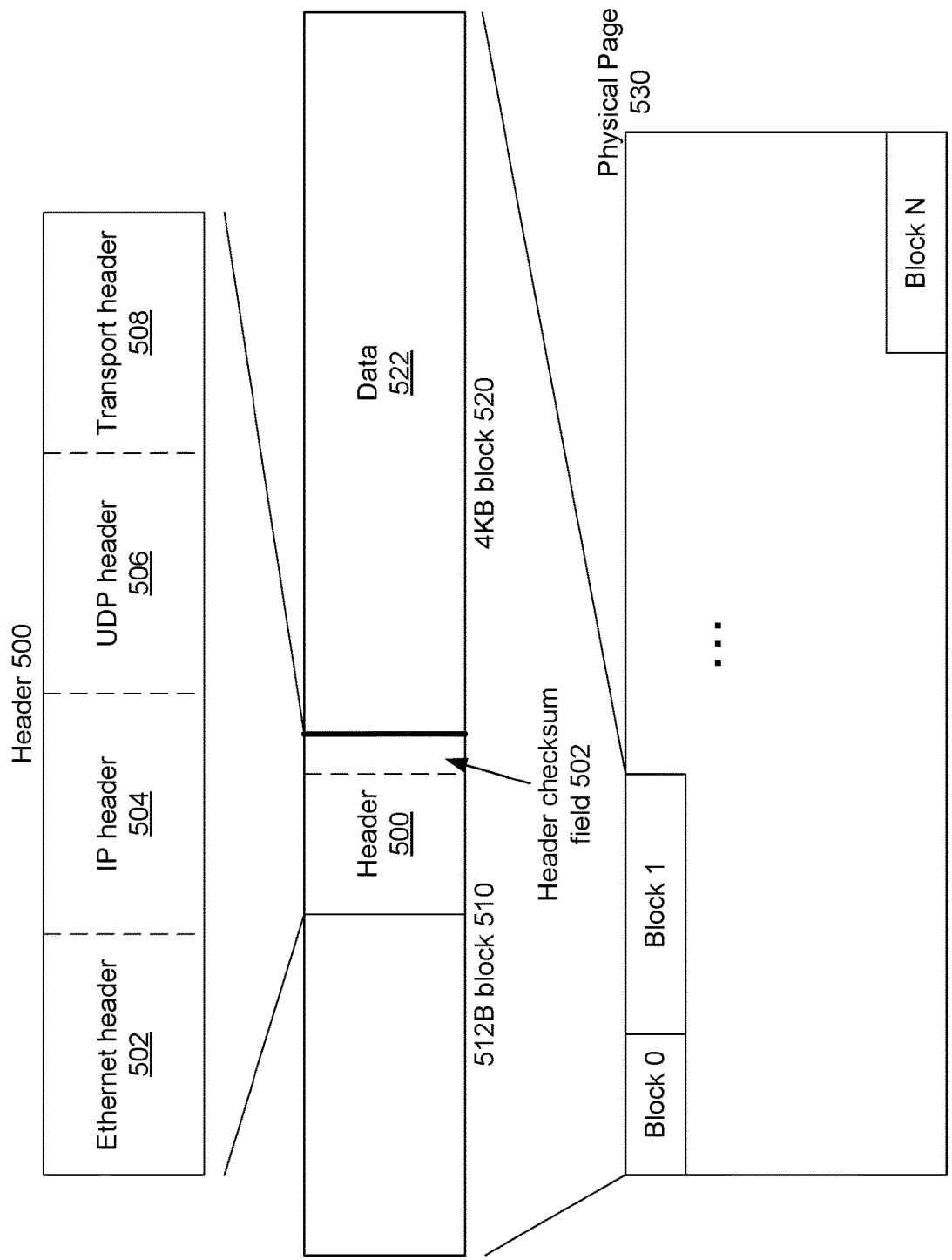
FIG. 5 illustrates an example memory management case in accordance with an example implementation of this disclosure.

FIG. 5 illustrates an example memory management case in accordance with an example implementation of this disclosure. Referring to FIG. 5, there is shown a header 500, a 512 byte block 510, a 4 KB block 520, and a physical memory page 530. Various embodiments of the disclosure may self-manage their own memory, thereby bypassing reliance on the kernel to do memory management and also to allow flexibility in interfacing with different technologies. For example, some NICs support large frames of over 1500 bytes for standard Ethernet transport up to 9 KBs, and also places 4 KB blocks of data on alignment of 512 bytes. The 4 KB block on 512 byte alignment is also supported by many SSDs. Some NICs (for example InfiniBand) may only support frames up to 4 KBs, and some SSDs may require memory alignment on 4 KB boundaries for memory access (reads and writes).

Various embodiments may use frames that look like standard UDP frames. Accordingly, the frame may have an Ethernet header, IP header, UDP header, transport header, and then the 4 KBs of data. The transport header may be the header used by various embodiments of the disclosure when transmitting data and receiving data. All of those headers combined may be 90 bytes. The 90 byte header is shown by the header 500, where the 90 bytes are at the end of the 512 byte memory space 510. The last two bytes of the header 500 may be the header checksum 502, which will be described more with respect to FIGS. 6A and 6B. The 4 KBs of data are in the 4 KB memory space 520. The header and data are written into two sequential blocks of memory of 512 bytes and 4 KBs, shown in this example as block 0 and block 1 in the physical memory page 530. For ease of reference, the header in block 0 may be referred to as the header block, and the data in block 0 may be referred to as the data block.

When 512 byte alignment is desired, the 4 KB blocks of data are aligned on 512 byte boundaries in memory. A 90 byte header may be in a 512 byte block of memory before the data, so each 4 KB block of data may actually take 4608 bytes (4 KBs+512 bytes). Accordingly, it can be seen that this results in 422 bytes (512 bytes−90 bytes) not being used for each 4 KBs of data, or about 10% waste.

The physical pages, such as the physical memory page 530, may be 2 MB in size (or 1 GB in size, etc.). The physical page size may depend on different designs and/or implementation. Due to the large physical page sizes, the 4 KB logical page for data and the 512 byte logical page for the associated header do not generally cross physical pages. Additionally, in order to enforce keeping the header and the data on the same physical page, a memory block at the end of a physical page may not be used if there is less than 4.5 KBs free at the end of a physical page. Accordingly, if block N at the end of the physical memory page 530 is less than 4.5 KBs, then the 4 KBs of data and the associated header will be written to a different physical page that has at least 4.5 KBs of contiguous memory free. Therefore, the 4 KB data and the associated header will always be on the same physical page.

Since the data and the associated header are always on the same physical page, the data may be pointed to in the networking and SSD IO code without having to copy and move the data around. Accordingly, once data arrives from the network, it can be passed to the IO to be written to SSD. When the data is written to the SSD, a pointer can be used for networking to access that data. Therefore, these data can be pointed to without having to copy them for different purposes. This alleviates the need for using a processor to copy data, and, accordingly, reduces latency due to the copying while preventing cache pollution that would occur with copying data. It can, therefore, be seen that this greatly increases the efficiency of data operations, including data transmission and reception.

Memory management may be performed, for example, by the VFS memory controller 204, by another dedicated memory management unit, or by a processor translating a logical (virtual) address to a physical address. In some embodiments, memory management may also include keeping track of free memory.

Figure 6B:
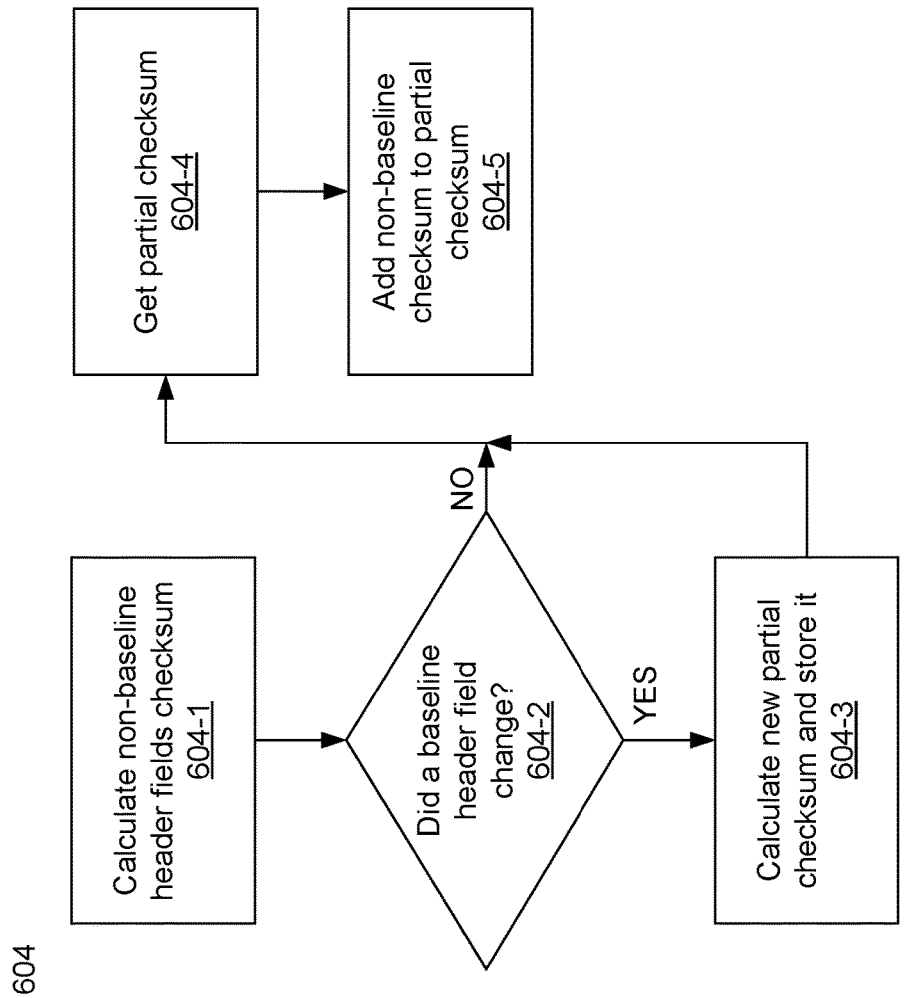
FIG. 6B is an example flow diagram that illustrates calculation of a header checksum using a partial checksum in accordance with an example implementation of this disclosure.
Figure 6A:
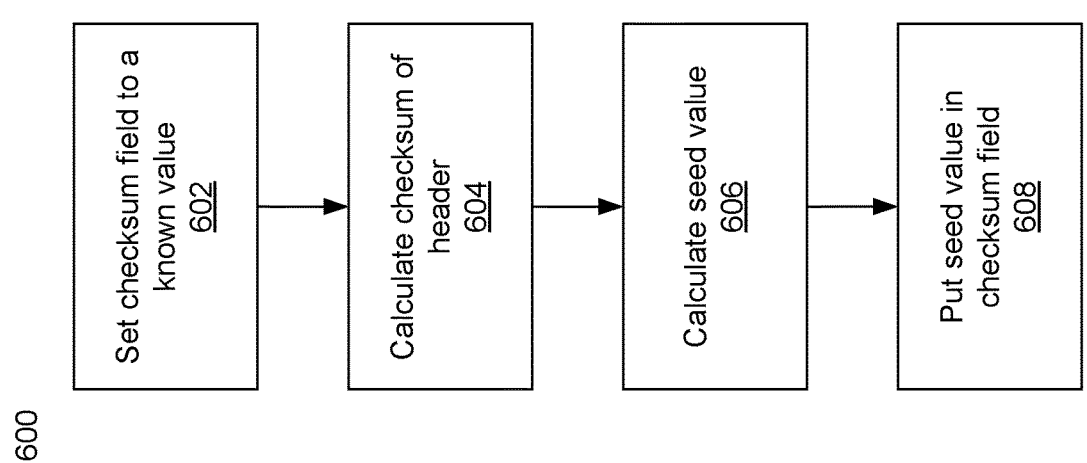
FIG. 6A is an example flow diagram that illustrates calculation of a header checksum in accordance with an example implementation of this disclosure.

Latency can also be reduced by allowing hardware to do more work as opposed to having a processor do software operations. For example, when transmitting data, a NIC such as, for example, the network adaptor 420, may be used to perform checksum (or CRC) operations. FIGS. 6A and 6B illustrate an example method of calculating a header checksum to facilitate using the NIC to calculate data checksum.

FIG. 6A is an example flow diagram that illustrates calculation of a header checksum in accordance with an example implementation of this disclosure. According to various embodiments of the disclosure, the last two bytes of the transport header may be selected to accelerate checksum calculation needed for the end-to-end-data protection. The two bytes, which may be referred to as the header checksum field 502, would be set to a value such that the checksum (or CRC) of the 90 byte header, which includes the two bytes, would equal zero. The value of the header checksum field 502 may be referred to as header checksum seed value. Since the 4 KBs of data starts right after those two bytes, when the NIC calculates the checksum (or CRC) for the header and the 4 KB data, the checksum is not affected by the header information. The resulting checksum for the header and the data, which is effectively for the data since the checksum is zero for the header, may be placed in the checksum field for the UDP header. Accordingly, in various embodiments, a processor may only need to calculate the checksum for the 90 byte header when transmitting data.

Referring to FIG. 6A, there is shown a flow diagram 600, where at 602 a header checksum field 502 in the header may be set to a known value, such as, for example, zero. At 604, a checksum of the header may be calculated. At 606, based on the checksum, a header checksum seed value may be determined. The header checksum seed value may be a value that may result in the header checksum being zero. At 608 the header checksum seed value may be placed in the checksum field of the header.

However, because source and destination may stay constant for many data packets, and the size is always 4186 bytes (4 KBs+90 bytes), the headers between two endpoints of networking may not change much. Accordingly, a checksum/CRC calculation may not need to be done for all 90 bytes of the header. The checksum/CRC may start with a baseline checksum and make appropriate changes over the baseline checksum as needed. The baseline checksum may be a checksum of the header fields that are not expected to change from one data block of 4 KBs to the next data block. The header fields may comprise baseline header fields and non-baseline header fields. The baseline header fields are those fields that are not expected to change for each data block. The non-baseline header fields are those fields that may change from data block to data block.

FIG. 6B is an example flow diagram that illustrates calculation of a header checksum using a partial checksum in accordance with an example implementation of this disclosure. Referring to FIG. 6B, there is shown the flow diagram 604 that is a more detailed flow diagram of the block 604 in the flow diagram 600.

At 604-1, a partial checksum may be calculated for the non-baseline header fields. Generally, a partial checksum may only need to be calculated, for example, for about 20 bytes. At 604-2, it may be determined whether any of the baseline header fields changed. This may be done by, for example, comparing the present baseline header fields with the previous baseline header fields. When the baseline header fields did change, a baseline checksum of the baseline header fields may be calculated and stored in 604-3. The next step may be 604-4.

When the base line header fields did not change, the next step may be 604-4. At 604-4 the baseline checksum may be retrieved. At 604-5, the baseline checksum may be added to the partial checksum to result in a header checksum.

When one or more of the baseline header fields change, various methods may be used to calculate new values for the header checksum field 502. One method may be to calculate a new checksum for all 90 bytes of the header to generate the appropriate values for the header checksum field 502, and also generate a new baseline header checksum. Then the succeeding headers will use the new baseline header checksum until one or more of the baseline header fields change.

Another method may be to generate multiple baseline checksums for different combinations of the baseline header fields. Then depending on what specific baseline field(s) changed, an appropriate baseline checksum may be used to generate a checksum for the header. Also, a baseline header field may be removed or added depending on, for example, a history of the changes to the baseline header fields and to the non-baseline header fields.

Accordingly, by letting the NIC do most of the work in generating the checksum, the checksum calculation overhead for the 4 KB data and 90 bytes of header information may be less than 0.5% of the work for calculating the checksum for 4096 bytes.

While a specific embodiment for checksum generation was described, various embodiments of the disclosure need not be so limited. For example, rather than setting the header checksum seed value to zero before generating a new checksum, the previous header checksum seed value may be left alone, and then subtracted from the new checksum, or otherwise operated on with the new checksum, to generate an accurate header checksum from which to generate a new header checksum seed value. Various options, such as, for example, the number of different baseline checksums to generate, may be design and/or implementation dependent.

In instances when more than one 4 KB data packet needs to be sent to a destination, an initial frame(s) may be sent with a description of the transaction using a remote procedure call ID (RPC ID). The data to be sent may be, for example, a large data structure. The initial frame may have all parameters that are not the actual data, followed by the frames with the data itself. Accordingly, for a write request by an entity, various embodiments may have the entity send a first frame with RPC ID, and all the parameters, followed by 4 KB frames with the data. Similarly, when a read request frame is received, a response frame may be sent followed by the data frames for the requested read operation. Since the UDP checksum field of a received frame holds the checksum for the frame, if the checksum for any frame does not match the sent checksum, the requesting entity may resend the RPC.

However, with some networks and/or network devices, the maximum transmission unit (MTU) of the network may not be able to go over 4 KBs and/or the data may need to be aligned on a 4 KB address. As explained above, when the data is aligned to 512 byte addresses, 422 bytes of 512 bytes may be unused, or about 10% of the data sent. Aligning to 4 KB addresses will leave unused almost 50% of the memory (only 90 bytes of 4096 bytes used for 4 KBs of data sent) if a header is placed in a 4 KB block for each 4 KBs of data.

Accordingly, to reduce unused space in memory and make transmission more efficient, various embodiments may have a process to reduce the overhead of the large number of unused bytes that need to be stored and transmitted. This process is illustrated in FIG. 7.

Figure 7:
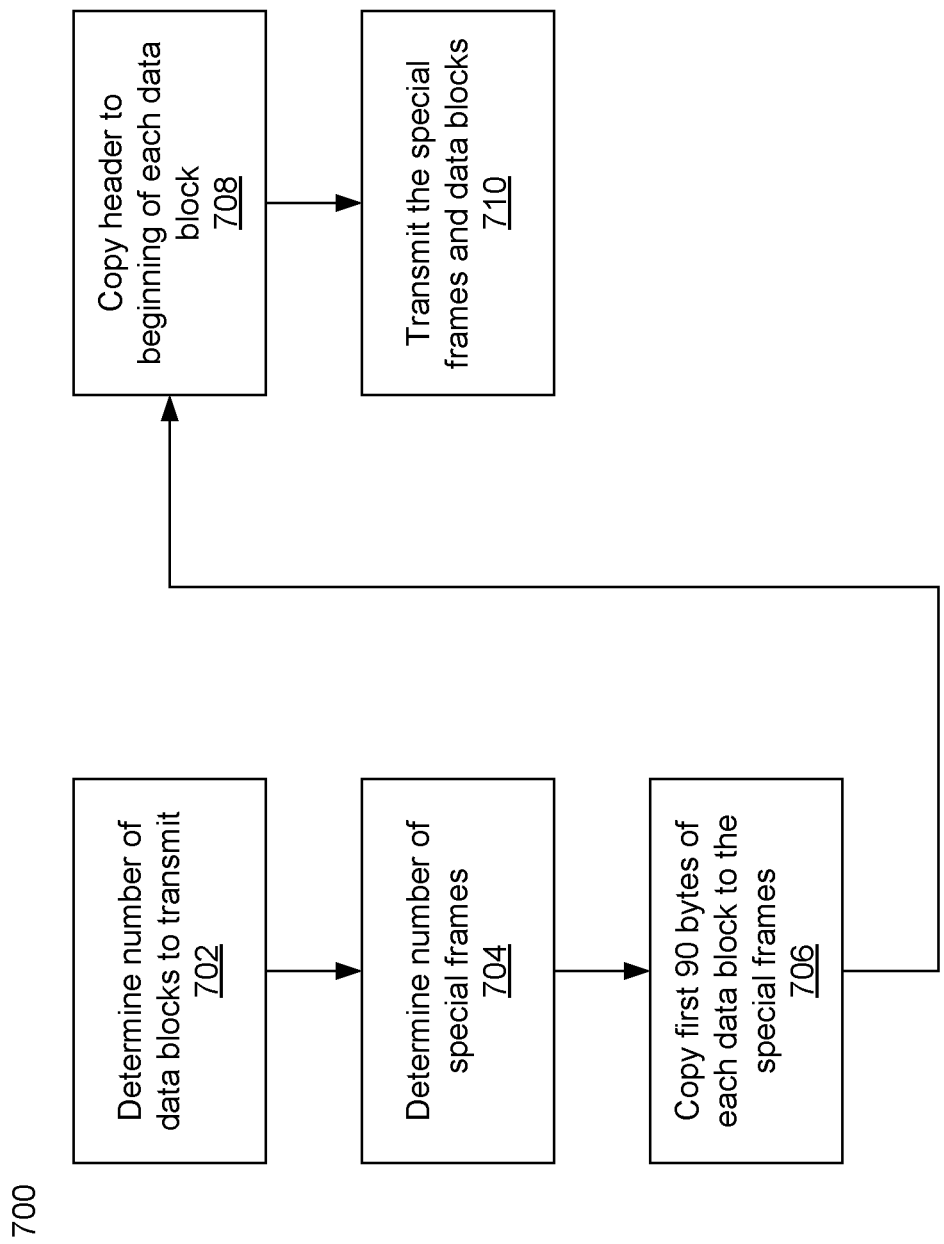
FIG. 7 is an example flow diagram that illustrates usage of special frames in accordance with an example implementation of this disclosure.

FIG. 7 is an example flow diagram that illustrates usage of special frames in accordance with an example implementation of this disclosure. Referring to FIG. 7, there is shown a flow diagram 700, where at 702 a determination is made of the number of data blocks that are to be transmitted to a single destination. Based on this number, the number of special frames needed may be calculated at 704. For example, if the header size is 90 bytes, and the data block size is set to 4 KBs, then a special frame may generally handle 4 KBs modulo 90 bytes. The first special frame may have some overhead such as, for example, an RPC ID. Accordingly, the first special frame may not be able to support as many data blocks as successive special frames.

At 706, the first 90 bytes of each 4 KB block may be copied to the first special frame, and the 90 byte header for each data block may be copied to the first 90 bytes of each corresponding data block. If there are too many 90 byte blocks to fit in one 4 KB frame, then a second special frame may be used for the remaining 90 byte blocks, etc., until all of the data blocks have been taken care of. While these 90 bytes have to be copied to the special frame(s) and to the data blocks, this is still a relatively small overhead for the 4 KB data block compared to handling a 4 KB header block, for which only 90 bytes is used for the header.

To compensate for moving the 90 bytes of data, various embodiments of the disclosure may adjust the data checksum by adding the checksum for the 4 KB block of data to the checksum for the corresponding 90 bytes of data in the special frame. The checksum for the 4 KB data block is effectively the checksum for the data portion since the header checksum is zero. Accordingly, while using special frames may take a little more processing than sending the 4 KBs of data individually, it reduces the overall latency compared to sending two 4 KB frames for each 4 KB of data.

For some embodiments of the disclosure, there may be a threshold of a minimum size of address alignment or a maximum data size supported for transmission before these special frames are used. For example, if the address alignment is on a 4 KB boundary, or if the maximum MTU is 4 KB, then the special frames may be used.

Also, there may be a threshold for a minimum number of 4 KB blocks of data that need to be transmitted before the special frames are used. For example, the overhead of copying the 90 bytes may not be worth the trouble if there is less than a minimum number of data blocks to transmit. In other embodiments of the disclosure, because the probability of sending one or few blocks of data is low, all transmission of data may use the special frames to reduce the number of different transmission cases that have to be supported. Also, an embodiment of the disclosure may be able to dynamically switch from one transmission process to another regarding the special frames.

Accordingly, an embodiment of the disclosure may comprise a system for networking, where an electronic device with a memory management unit is configured to enable writing data and its header to a physical memory page, where the data is written to a data block in the physical memory page and the header is written to a header block in the physical memory page. The electronic device may also comprise a processor configured to generate and store a header checksum seed value in a header checksum field to make a header checksum equal to zero, and a network adaptor configured to transmit the header block and the data block.

The network adaptor may be configured to calculate a data checksum for the data block, and the processor may be configured to generate the header checksum seed value from the header checksum, where the processor calculated the header checksum with the header checksum seed value set to a pre-determined number such as, for example, zero.

The processor may also be configured to use a partial checksum to generate the header checksum, where the partial checksum is a checksum for baseline header fields. The baseline header fields are those header fields that may not be expected to change from a transmission of a first data block to a transmission of a second data block. The baseline fields may be pre-determined, and the header fields selected to be the baseline fields may be changed dynamically.

The processor may also be configured to generate a new partial checksum when one or more of the baseline header fields have changed for the second data block compared to the first data block. The processor may then generate the header checksum by adding the partial checksum to a checksum of non-baseline header fields.

When a number of bytes in the header block not used for storing the header is greater than a first pre-determined threshold, the processor is configured to use a special frame for transmission prior to transmitting the data. That is, special frames may be used at some point as the header block gets larger compared to the header size. Furthermore, the processor may be configured to use an additional special frame when a number of data blocks to be transmitted is greater than a second pre-determined threshold. The number of special frames used may be dependent on design and/or implementation.

The processor may be configured to copy a first number of bytes at a beginning of the data block to the special frame, where the first number of bytes is the number of bytes in the header. The header may then be copied to the beginning of the data block A network adaptor may be configured to communicate inbound traffic directly to a child partition executing on the processor, and receive outbound traffic directly from the child partition.

An embodiment of the disclosure may disclose a method for networking, comprising writing data and a header for the data to a physical memory page, where the data in the physical memory page is referred to as a data block and the header in the physical memory page is referred to as a header block. A header checksum seed value may be stored in a header checksum field to make a header checksum equal to zero, and the header and data may then be transmitted, where a network adaptor is used to generate a checksum for the data block.

The header checksum seed value may be generated from the header checksum, where the header checksum was calculated with the header checksum seed value set to a pre-determined number, such as, for example, zero. A partial checksum may be used to generate the header checksum, where the partial checksum is a checksum for baseline header fields, and the baseline header fields are those header fields that are not expected to change from a transmission of a first data block to a transmission of a second data block. The baseline header fields may be pre-determined, and may also be changed dynamically.

A new partial checksum may be generated when one or more of the baseline header fields have changed for the second data block compared to the first data block. The header checksum may be generated by adding the partial checksum to a checksum of non-baseline header fields, the non-baseline header fields being the header fields that are not baseline header fields.

When a number of bytes not used for storing the header in the header block is greater than a first pre-determined threshold, a special frame may be transmitted prior to transmitting the data block. In that case, a first number of bytes at a beginning of the data block may be copied to the special frame, where the first number of bytes is the number of bytes in the header, and the header may be copied to the beginning of the data block.

A child partition executing on the processor may receive inbound traffic directly from the network adaptor and transmit outbound traffic directly to the network adaptor, where the network adaptor is configured for the direct communication with the child partition.

Accordingly, it can be seen that the various methods described can greatly improve the efficiency for a network node when processing data for use internally, or for transmission, including reducing latency for efficient networking between various network nodes.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a transmitter configured to transmit a data block and a header block, wherein a checksum seed of the header block is generated such that a checksum of the header block, generated according to the checksum seed, is equal to zero; and
a processor configured to generate the checksum according to a pre-determined header field that is not expected to change from a transmission of a first data block to a transmission of a second data block.

2. The system of claim 1, wherein a processor is configured to use a partial checksum to generate the checksum.

3. The system of claim 1, wherein a processor is configured to generate the checksum according to a baseline header field.

4. The system of claim 1, wherein the transmitter is configured to transmit a special frame prior to the header block, if a number of bytes in the header block is greater than a threshold.

5. The system of claim 1, wherein the transmitter is configured to transmit a special frame prior to the data block, if a number of bytes in the data block is greater than a threshold.

6. The system of claim 1, wherein a processor is configured to:
execute a child partition on the processor; and
send outbound traffic from the child partition directly to the transmitter.

7. The system of claim 1, wherein the checksum seed is generated by a processor.

8. The system of claim 1, wherein the checksum seed is one of a plurality of pre-determined numbers.

9. The system of claim 1, wherein the checksum is generated by adding a partial checksum to a checksum of a non-baseline field.

10. A method comprising:
generating a checksum seed of a header block such that a checksum of the header block, generated according to the checksum seed, is equal to zero;
communicating, via a transmitter, a data block and the header block; and
generating the checksum seed according to a pre-determined header field that is not expected to change between a transmission of a first data block and a transmission of a second data block.

11. The method of claim 10, wherein the method comprises generating the checksum according to a partial checksum.

12. The method of claim 10, wherein the method comprises generating the checksum according to a baseline header field.

13. The method of claim 10, wherein the method comprises transmitting a special frame prior to the header block, if a number of bytes in the header block is greater than a threshold.

14. The method of claim 10, wherein the method comprises transmitting a special frame prior to the data block, if a number of bytes in the data block is greater than a threshold.

15. The method of claim 10, wherein the method comprises:
executing a child partition; and
sending outbound traffic from the child partition directly to the transmitter.

16. The method of claim 10, wherein the checksum seed is generated by a processor.

17. The method of claim 10, wherein the checksum seed is one of a plurality of pre-determined numbers.

18. The method of claim 10, wherein the method comprises generating the checksum by adding a partial checksum to a checksum of a non-baseline field.

19. A system comprising:
a transmitter configured to transmit a data block and a header block, wherein:
a checksum seed of the header block is generated such that a checksum of the header block, generated according to the checksum seed, is equal to zero, and
the transmitter is configured to transmit a special frame prior to the header block, if a number of bytes in the header block is greater than a threshold.

20. The system of claim 19, wherein a processor is configured to use a partial checksum to generate the checksum.

21. The system of claim 19, wherein a processor is configured to generate the checksum according to a baseline header field.

22. The system of claim 19, wherein the transmitter is configured to transmit a special frame prior to the data block, if a number of bytes in the data block is greater than a threshold.

23. The system of claim 19, wherein a processor is configured to:
execute a child partition on the processor; and
send outbound traffic from the child partition directly to the transmitter.

24. The system of claim 19, wherein the checksum seed is generated by a processor.

25. The system of claim 19, wherein the checksum seed is one of a plurality of pre-determined numbers.

26. The system of claim 19, wherein the checksum is generated by adding a partial checksum to a checksum of a non-baseline field.

27. A method comprising:
generating a checksum seed of a header block such that a checksum of the header block, generated according to the checksum seed, is equal to zero;
communicating, via a transmitter, a data block and the header block; and
transmitting a special frame prior to the header block, if a number of bytes in the header block is greater than a threshold.

28. The method of claim 27, wherein the method comprises generating the checksum according to a partial checksum.

29. The method of claim 27, wherein the method comprises generating the checksum according to a baseline header field.

30. The method of claim 27, wherein the method comprises transmitting a special frame prior to the data block, if a number of bytes in the data block is greater than a threshold.

31. The method of claim 27, wherein the method comprises:
executing a child partition; and
sending outbound traffic from the child partition directly to the transmitter.

32. The method of claim 27, wherein the checksum seed is generated by a processor.

33. The method of claim 27, wherein the checksum seed is one of a plurality of pre-determined numbers.

34. The method of claim 27, wherein the method comprises generating the checksum by adding a partial checksum to a checksum of a non-baseline field.

35. A system comprising:
a transmitter configured to transmit a data block and a header block, wherein:
a checksum seed of the header block is generated such that a checksum of the header block, generated according to the checksum seed, is equal to zero, and
the transmitter is configured to transmit a special frame prior to the data block, if a number of bytes in the data block is greater than a threshold.

36. The system of claim 35, wherein a processor is configured to use a partial checksum to generate the checksum.

37. The system of claim 35, wherein a processor is configured to generate the checksum according to a baseline header field.

38. The system of claim 35, wherein a processor is configured to:
execute a child partition on the processor; and
send outbound traffic from the child partition directly to the transmitter.

39. The system of claim 35, wherein the checksum seed is generated by a processor.

40. The system of claim 35, wherein the checksum seed is one of a plurality of pre-determined numbers.

41. The system of claim 35, wherein the checksum is generated by adding a partial checksum to a checksum of a non-baseline field.

42. A method comprising:
generating a checksum seed of a header block such that a checksum of the header block, generated according to the checksum seed, is equal to zero;
communicating, via a transmitter, a data block and the header block; and transmitting a special frame prior to the data block, if a number of bytes in the data block is greater than a threshold.

43. The method of claim 42, wherein the method comprises generating the checksum according to a partial checksum.

44. The method of claim 42, wherein the method comprises generating the checksum according to a baseline header field.

45. The method of claim 42, wherein the method comprises:
executing a child partition; and
sending outbound traffic from the child partition directly to the transmitter.

46. The method of claim 42, wherein the checksum seed is generated by a processor.

47. The method of claim 42, wherein the checksum seed is one of a plurality of pre-determined numbers.

48. The method of claim 42, wherein the method comprises generating the checksum by adding a partial checksum to a checksum of a non-baseline field.

49. A system comprising:
a transmitter configured to transmit a data block and a header block, wherein a checksum seed of the header block is generated such that a checksum of the header block, generated according to the checksum seed, is equal to zero; and
a processor configured to:
execute a child partition on the processor; and
send outbound traffic from the child partition directly to the transmitter.

50. The system of claim 49, wherein a processor is configured to use a partial checksum to generate the checksum.

51. The system of claim 49, wherein a processor is configured to generate the checksum according to a baseline header field.

52. The system of claim 49, wherein the checksum seed is generated by a processor.

53. The system of claim 49, wherein the checksum seed is one of a plurality of pre-determined numbers.

54. The system of claim 49, wherein the checksum is generated by adding a partial checksum to a checksum of a non-baseline field.

55. A method comprising:
generating a checksum seed of a header block such that a checksum of the header block, generated according to the checksum seed, is equal to zero;
communicating, via a transmitter, a data block and the header block, executing a child partition; and
sending outbound traffic from the child partition directly to the transmitter.

56. The method of claim 55, wherein the method comprises generating the checksum according to a partial checksum.

57. The method of claim 55, wherein the method comprises generating the checksum according to a baseline header field.

58. The method of claim 55, wherein the checksum seed is generated by a processor.

59. The method of claim 55, wherein the checksum seed is one of a plurality of pre-determined numbers.

60. The method of claim 55, wherein the method comprises generating the checksum by adding a partial checksum to a checksum of a non-baseline field.

61. A system comprising:
a transmitter configured to transmit a data block and a header block, wherein:
a checksum seed of the header block is generated such that a checksum of the header block, generated according to the checksum seed, is equal to zero, and
the checksum is generated by adding a partial checksum to a checksum of a non-baseline field.

62. The system of claim 61, wherein a processor is configured to use a partial checksum to generate the checksum.

63. The system of claim 61, wherein a processor is configured to generate the checksum according to a baseline header field.

64. The system of claim 61, wherein the checksum seed is generated by a processor.

65. The system of claim 61, wherein the checksum seed is one of a plurality of pre-determined numbers.

66. A method comprising:
generating a checksum seed of a header block such that a checksum of the header block, generated according to the checksum seed, is equal to zero;
communicating, via a transmitter, a data block and the header block; and
generating the checksum by adding a partial checksum to a checksum of a non-baseline field.

67. The method of claim 66, wherein the method comprises generating the checksum according to a partial checksum.

68. The method of claim 66, wherein the method comprises generating the checksum according to a baseline header field.

69. The method of claim 66, wherein the checksum seed is generated by a processor.

70. The method of claim 66, wherein the checksum seed is one of a plurality of pre-determined numbers.

* * * * *